Patented Oct. 8, 1929

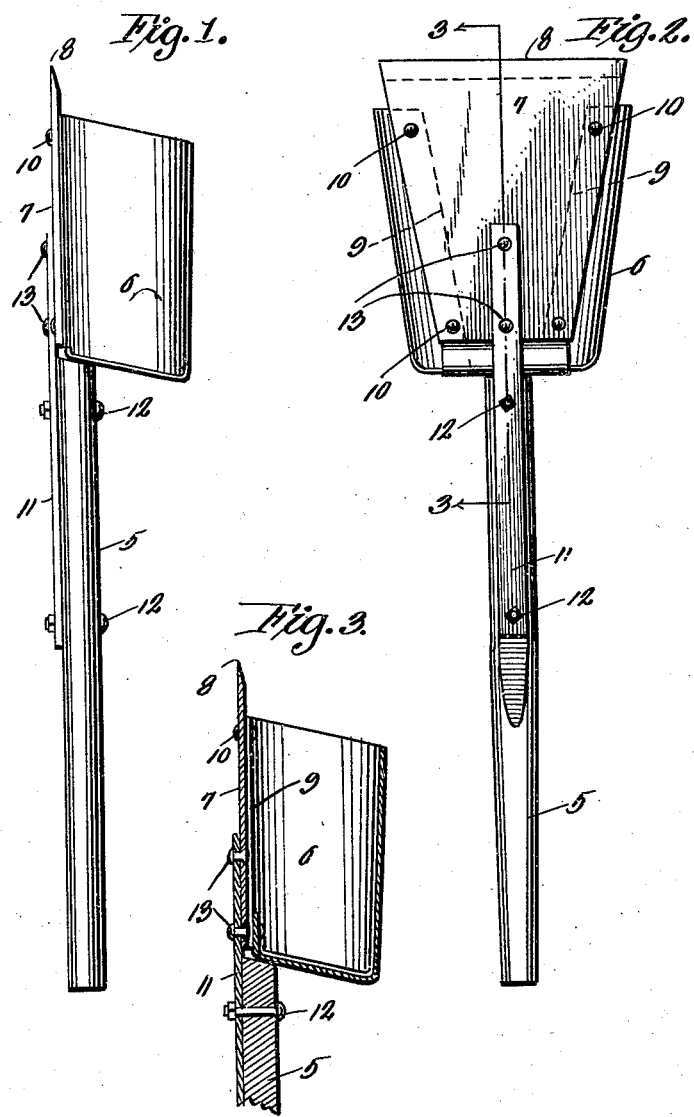

1,730,458

UNITED STATES PATENT OFFICE

LUCIUS G. HAM, OF CAIRO, GEORGIA

SCRAPE REMOVING AND COLLECTING IMPLEMENT

Application filed May 13, 1926. Serial No. 108,989.

This invention relates to a scrape removing and collecting implement, and has more particular reference to an improved device designed for removing scrape from the faces of pine trees, and for collecting the scrape as it is removed.

As is well known, a pine tree is worked for turpentine purposes by scarifying the face of the tree above the point where a cup is hung for the purpose of collecting the gum which exudes from the scarified surface, and in this process the bark of the tree where so scarified is completely removed. All of the gum which exudes from the tree does not drain into the cup, but during the turpentine season, a residual of the gum becomes attached to the scarified surface, hardens and forms what is known as "scrape," so that by the end of the season the face or scarified surface has become covered with scrape of varying thickness. This scrape will yield, upon distillation, spirits of turpentine and rosin of about as good quality as, but less in volume than a similar mass of the crude gum. At the present time, the scrape is removed by the use of a tool having a flat blade formed with a sharp edge and shaped somewhat similar to a common wood chisel. When using this conventional tool, the scrape is adapted to fall by gravity into a separate receptacle placed beneath the scarified face of the tree, but in actual practice, much of the scrape removed falls to the ground and is lost.

The primary object of the present invention is to provide a scrape removing and collecting implement embodying a scrape removing blade and a scrape collecting receptacle so related that the scrape will naturally pass into the receptacle as it is being removed by the blade, and whereby the likelihood of losing the scrape by reason of the same falling to the ground, is reduced to a minimum.

A further object is to provide a scrape removing and collecting implement of the above kind which is extremely simple and durable in construction as well as efficient in use.

Other objects will become apparent as the nature of the invention is better understood, and the same consists in the novel form, combination and arrangement of parts hereinafter more fully described, shown in the accompanying drawing and claimed.

In the drawing, wherein like reference characters indicate corresponding parts throughout the several views, Figure 1 is a side elevational view of a scrape removing and collecting implement constructed in accordance with the present invention;

Figure 2 is a rear elevational view thereof; and

Figure 3 is a fragmentary longitudinal section taken substantially upon line 3—3 of Figure 2.

Referring more in detail to the drawing, the present invention, generally speaking, embraces the provision of a suitable handle 5 having a scrape collecting cup 6 rigidly attached to the upper end thereof, and a scraping blade 7 rigid with the back of the cup 6 and projecting above the top of the latter where the same is formed with a sharpened scraping edge 8 at its free upper end and slightly above the top of the cup. Thus, the cup is positioned so that when the scrape is removed from the tree by the use of the blade 8, such scrape will naturally pass into the cup for effective collection without material likelihood of falling to the ground and becoming lost.

In the preferred specific construction of the invention shown, the cup 6 embodies a body or apron constructed of a suitably shaped sheet of metal so as to be partially open at the rear side thereof and present inturned vertically disposed rear flanges 9 to which the longitudinal edge portions of the blade 7 are rigidly secured as by riveting or the like, indicated at 10, whereby the blade 7 substantially forms the rear wall of the cup. This construction results in economy of material, ease of manufacture and enables construction of the blade 7 from a heavier gage of metal than that used for the body portion or apron of the cup, as is desirable. However, although the blade 7 is shown as acting as a true rear wall of the cup, it is obvious that the cup may be completely constructed from the same metal blank so as to not be open at the back thereof, the blade thus being attached to the back wall of the cup and merely constituting a false back wall thereof.

As shown, the handle 5 is preferably in the form of a wooden bar disposed with its upper end in abutting relation to the bottom of the cup 6 near the back thereof, and rigidly attached to the cup in this relation by means of a metallic strap or bar 11 disposed longitudinally of the upper end portion of the handle and the lower portion of the blade 7 as well as rigidly secured to said blade and the handle by suitable means, such as clamping bolts 12 passing through the lower end of the bar 11 and the upper end of the handle 5, and rivets 13 passing through the upper end of the bar 11 and through the blade 7.

In using the implement the handle 5 is grasped by the user so that the cup is positioned uppermost, and upon engagement of the scraping edge 8 with the surface, the tool is given an upward movement or stroke. As the scrape is removed from the surface in this manner it naturally passes outwardly and into the cup for effective collection as will be apparent.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:

A scrape collecting receptacle comprising a body of sheet metal having a front wall and having the side portions thereof formed to set up rearwardly extending side walls and each having its rear edge turned inwardly to provide edge opposed spaced rear wall flanges, a bottom wall formed integral with the lower edge of said front wall and extending rearwardly between the lower portions of said side walls and terminating in a rear upwardly extending transversely arranged flange, means for securing said transverse flange to the lower portions of said back wall flanges, a plate body overlying the rear faces of said flanges and connecting between the side wall flanges, and securing elements passing through said plate and flanges, said plate extending above the top of the receptacle and formed to set up the scrape blade.

In testimony whereof I affix my signature.

LUCIUS G. HAM.